(12) United States Patent
Lin et al.

(10) Patent No.: US 12,367,429 B2
(45) Date of Patent: Jul. 22, 2025

(54) METHOD AND DEVICE FOR OPTIMIZING DEEP LEARNING MODEL CONVERSION, AND STORAGE MEDIUM

(71) Applicant: HON HAI PRECISION INDUSTRY CO., LTD., New Taipei (TW)

(72) Inventors: Tzu-Chen Lin, New Taipei (TW); Guo-Chin Sun, New Taipei (TW); Chih-Te Lu, New Taipei (TW); Tung-Tso Tsai, New Taipei (TW); Jung-Hao Yang, New Taipei (TW); Chung-Yu Wu, New Taipei (TW); Wan-Jhen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1009 days.

(21) Appl. No.: 17/405,523

(22) Filed: Aug. 18, 2021

(65) Prior Publication Data

US 2022/0058530 A1 Feb. 24, 2022

(30) Foreign Application Priority Data

Aug. 20, 2020 (CN) .......................... 202010845217.8

(51) Int. Cl.
*G06N 20/20* (2019.01)
*G06F 18/21* (2023.01)
*G06F 18/22* (2023.01)

(52) U.S. Cl.
CPC ......... *G06N 20/20* (2019.01); *G06F 18/2163* (2023.01); *G06F 18/217* (2023.01); *G06F 18/22* (2023.01)

(58) Field of Classification Search
CPC ....... G06N 20/20; G06F 18/22; G06F 18/217; G06F 18/2163
See application file for complete search history.

(56) References Cited

U.S. PATENT DOCUMENTS

| | | | |
|---|---|---|---|
| 2020/0249936 A1* | 8/2020 | Barfield, Jr. | G06F 8/60 |
| 2021/0004681 A1* | 1/2021 | Tate | G06N 3/067 |
| 2021/0042516 A1* | 2/2021 | Panakkal | G06V 30/413 |
| 2021/0182670 A1* | 6/2021 | Kim | G06N 3/08 |
| 2022/0028058 A1* | 1/2022 | Mohamed | G06F 18/214 |
| 2024/0211724 A1* | 6/2024 | Kou | G06N 3/0985 |

* cited by examiner

*Primary Examiner* — Beau D Spratt
(74) *Attorney, Agent, or Firm* — ScienBiziP, P.C.

(57) ABSTRACT

A method for optimizing the conversion of a deep learning model to process other data, applied in a device, includes converting a first deep learning model to obtain a second deep learning model, obtaining a weighting arrangement of the two models according to their deep learning frameworks and performing a quantization on the two models. A similarity in weighting between the two models is analyzed to produce a weighting analysis based on the first and second weighting arrangement and the first and second model quantization result weighting. The two models are tested to establish a model performance analysis. One or more suggestions for optimization are obtained based on the weighting analysis and the model performance analysis, and are applied to optimize the second deep learning model, an optimized second deep learning model being employed to process the other data.

17 Claims, 3 Drawing Sheets

METHOD AND DEVICE FOR OPTIMIZING DEEP LEARNING MODEL CONVERSION, AND STORAGE MEDIUM

FIELD

The subject matter herein generally relates to data processing.

BACKGROUND

Current deep learning frameworks may comprise TensorFlow, Caffe, NCNN, Pytorch and other frameworks. In developing an algorithm for deployment, different deep learning frameworks may be used. For example, a framework of Tensorflow is used in an algorithm development and debugging stage, a framework of NCNN is used in a deployment stage, and model conversion problems may occur. In order to ensure that a converted model can still have an excellent prediction accuracy, it is necessary to analyze and optimize the converted model. The current analysis and optimization are performed by an experienced engineer, and the current method relies on professionalism of the experienced engineer, but the process is time-consuming and inefficient.

Thus, there is room for improvement.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
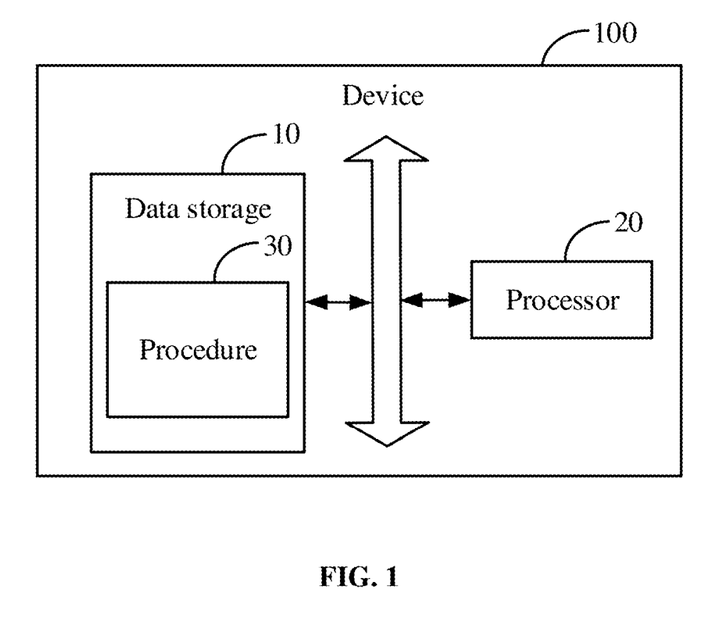
FIG. 1 is a block diagram of an embodiment of a device for optimizing conversion of models for deep learning.

FIG. 1 illustrates a device 100 for optimizing model conversion of deep learning model in accordance with an embodiment. The device 100 provides suggestions for model optimization in a model conversion process between different frameworks, and a performance prediction of the model before and after the conversion is obtained, so as to improve data processing efficiency and accuracy.

In one embodiment, the device 100 can comprise at least one data storage 10, at least one processor 20, and a procedure 30 for optimizing model conversion of deep learning model. For example, the device 100 can be a computer, a mobile phone, or a server. The device 100 can further comprise a display device, a network access device, and communication buses.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

Figure 2:
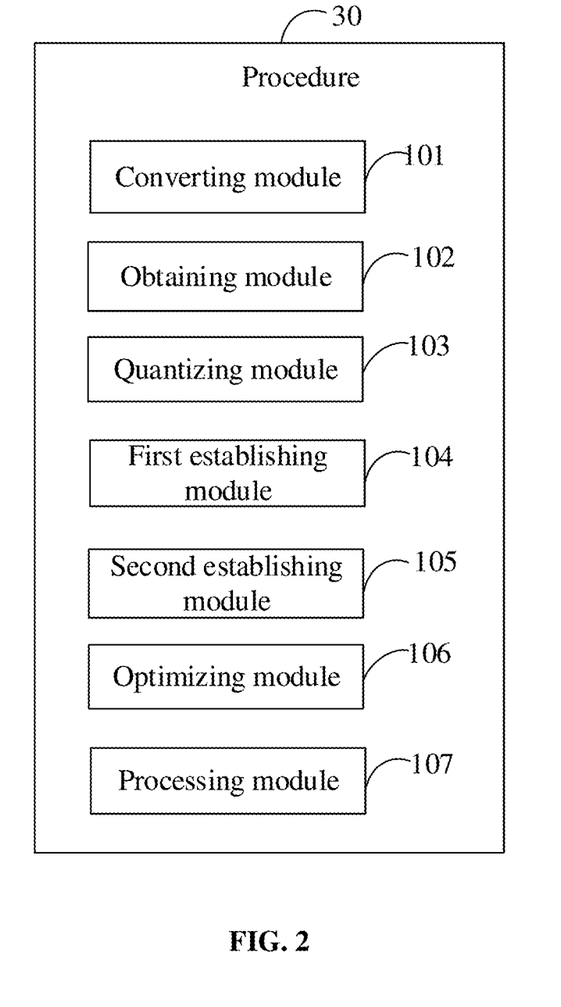
FIG. 2 is a block diagram of an embodiment of a procedure optimizing conversion of models for deep learning of the device of FIG. 1.

FIG. 2 illustrates the procedure 30 as comprising a plurality of modules, such as a converting module 101, an obtaining module 102, a quantizing module 103, a first establishing module 104, a second establishing module 105, an optimizing module 106, and a processing module 107. The modules 101-107 may comprise one or more software programs in the form of computerized codes stored in the data storage 10. The computerized codes may include instructions that can be executed by the processor 20 to provide functions for the modules 101-107.

The converting module 101 performs a conversion on a first deep learning model to obtain a second deep learning model.

In one embodiment, the first deep learning model and the second deep learning model comprise different deep learning frameworks. For example, in a model development stage, the first deep learning model can be developed, trained and tested based on a Tensorflow framework. When a terminal device needs a model of an NCNN framework to be deployed, the first deep learning model with the Tensorflow framework can be converted into a second deep learning model with the NCNN framework, and the second deep learning model is deployed on the terminal device. The terminal device may be an electronic device, such as a mobile phone or a tablet computer. The converting module 101 can perform a model conversion on the first deep learning model based on a predetermined deep learning model conversion tool to obtain the second deep learning model. The predetermine deep learning model conversion tool may be any current model converter, not being limited here.

In one embodiment, the first deep learning model and the second deep learning model comprise the same model functions, the model functions of the first deep learning model and the second deep learning model can be set according to an actual requirement. For example, the first deep learning model and the second deep learning model can be configured for image recognition, voice recognition, image processing, data mining, or natural language processing, etc.

In one embodiment, the first deep learning model and the second deep learning model can be trained based on samples of a training sample library. The samples of a training sample library can be divided into a training set and a verifying set. The training set is configured for training the models, and the verification set is configured for testing a performance of trained models.

The obtaining module 102 obtains a first weighting arrangement of the first deep learning model based on a deep learning framework of the first deep learning model, and obtains a second weighting arrangement of the second deep learning model based on a deep learning framework of the second deep learning model.

In one embodiment, when the model conversion of the first deep learning model is completed to obtain the second deep learning model, the obtaining module 102 can obtain the second weighting arrangement of the second deep learning model according to the deep learning framework of the second deep learning model. The obtaining module 102 can further obtain the first weighting arrangement mode of the first deep learning model according to the deep learning framework of the first deep learning model. The first weighting arrangement of the first deep learning model can represent an arrangement of weighting parameters of the first deep learning model, and the second weighting arrangement of the second deep learning model can represent an arrangement of weighting parameters of the second deep learning model.

The quantizing module 103 performs a quantization on the first deep learning model and the second deep learning model to obtain a first model quantization result and a second model quantization result.

In one embodiment, the quantizing module 103 may perform a specified quantization operation on the first deep learning model to obtain the first model quantization result, and perform the specified quantization operation on the second deep learning model to obtain the second model quantization result. For example, the specified quantization operation may be performing quantization on weightings of models, or performing quantization on weightings of models and outputting results of activation layers of model.

In one embodiment, the quantizing module 103 can obtain weighting distribution information of the first deep learning model based on the first weighting arrangement of the first deep learning model, and perform the quantization on the first deep learning model according to the weighting distribution information of the first deep learning model. The weighting distribution information of the first deep learning model can represent a distribution of weighting parameters of the first deep learning model. The quantizing module 103 can obtain weighting distribution information of the second deep learning model based on the second weighting arrangement of the second deep learning model, and perform the quantization on the second deep learning model according to the weighting distribution information of the second deep learning model. The weighting distribution information of the second deep learning model can represent a distribution of weighting parameters of the second deep learning model.

In one embodiment, the quantizing module 103 performing the quantization on the first deep learning model according to the weighting distribution information of the first deep learning model can comprise: the quantizing module 103 determining a first number of bits and a first quantization accuracy (int or float) of the quantization of the first deep learning model according to the weighting distribution information of the first deep learning model, and performing the quantization on the first deep learning model based on the first number of bits and the first quantization accuracy. The quantizing module 103 performing the quantization on the second deep learning model according to the weighting distribution information of the second deep learning model can comprise: the quantizing module 103 determining a second number of bits and a second quantization accuracy (int or float) of the quantization of the second deep learning model according to the weighting distribution information of the second deep learning model, and performing the quantization on the second deep learning model based on the second number of bits and the second quantization accuracy.

The first establishing module 104 analyzes a weighting similarity between the first deep learning model and the second deep learning model based on the first weighting arrangement and the first model quantization result of the first deep learning model, and the second weighting arrangement and the second model quantization result of the second deep learning model, and establishes a weighting analysis report based on results of the weighting similarity.

In one embodiment, when the first deep learning model and the second deep learning model are quantized by the quantizing module 103, the first establishing module 104 can analyze the weighting similarity between the first deep learning model and the second deep learning model based on the first weighting arrangement, the first model quantization result, the second weighting arrangement, and the second model quantization result. Then the weighting analysis report can be established based on the results of the weighting similarity.

In one embodiment, the weighting analysis report can comprises the weighting distribution information of the first deep learning model and the weighting distribution information of the second deep learning model.

The second establishing module 105 tests the first learning model and the second deep learning model based on a predetermined test set and establishes a model performance analysis report based on result of tests.

In one embodiment, the model performance analysis report can comprise test results of predicted performance of the first deep learning model and test results of predicted performance of the second deep learning model. Data of the predetermined test set can comprise the samples of the training sample library that are configured to train the first deep learning model and the second deep learning model, and the samples of the training sample library are divided into the training set and the verifying set.

For example, the model functions of the first deep learning model and the second deep learning model are the function of image recognition. The training sample library can comprise one thousand sample images, the training set comprises eight hundred sample images, and the verifying set comprises two hundred sample images. In a training process of the first deep learning model, the first deep learning model is trained based on sample images of the training set, and trained first deep learning model is tested based on sample images of the verifying set to obtain a prediction of the trained first deep learning model. In a training process of the second deep learning model, the second deep learning model is trained based on the sample images of the training set, and trained second deep learning model is tested based on the sample images of the verifying set to obtain a prediction of the trained second deep learning model. The predetermined test set comprises all sample images of the training sample library, the second establishing module 105 employs the one thousand sample images to test the first deep learning model, and employs the one thousand sample images to test the second deep learning model. The second establishing module 105 establishes the model performance analysis report based on test results of the one thousand sample images.

In one embodiment, the data of the predetermined test set can further comprise an on-site sample set that is not comprised in the training sample library. For example, sample data of the on-site sample set is data that the model does not touch during the training process. When the second deep learning model is deployed on the terminal device, the on-site sample set may comprise sample data that is obtained by the terminal device in an actual scenario. For example, the second deep learning model is a face recognition model, and the on-site sample set may comprise face images that are captured in an actual face recognition scene.

In one embodiment, the data of the predetermined test set can further comprise an amplified sample set generated by amplifying the verifying set. For example, the samples of the verifying set can be flipped, mirrored, etc., to obtain the amplified sample set.

For example, the verifying set comprises two hundred sample images, multiple sample images of the verifying set can be performed one or more processes, such as translation, flipping, rotation, adjusting contrast, adding Gaussian noise, and color transformation, to obtain two thousand sample images, and the two thousand sample images can be defined as the amplified sample set.

In one embodiment, the second establishing module 105 testing the first learning model and the second deep learning model based on the predetermined test set to establish the model performance analysis report can comprise: the second establishing module 105 respectively testing the first learning model and the second deep learning model based on the training sample library, the on-site sample set, and the amplified sample set, and establishing the model performance analysis report based on a first test result of the training sample library, a second test result of the on-site sample set, and a third test result of the amplified sample set.

The optimizing module 106 obtains one or more suggestions for optimizing the second deep learning model based on the weighting analysis report and the model performance analysis report to optimize the second deep learning model.

In one embodiment, when the weighting analysis report and the model performance analysis report are obtained, the optimizing module 106 can analyze and obtain the one or more optimization suggestions of the second deep learning model based on the weighting analysis report and the model performance analysis report, to optimize the second deep learning model. Then, the prediction accuracy of the second deep learning model deployed on the terminal device can be improved, and computing resources (of the terminal device) occupied by the second deep learning model can be saved.

In one embodiment, when the optimizing module 106 obtains the one or more optimization suggestions of the second deep learning model based on the weighting analysis report and the model performance analysis report, a model developer or a user can control the second deep learning model to execute the one or more optimization suggestions.

The processing module 107 employs an optimized second deep learning model to process object data.

In one embodiment, object data may refer to data that needs to be processed by the second deep learning model deployed on the terminal device. For example, the second deep learning model is the face recognition model, the object data is the face images captured on-site by the terminal device. When the second deep learning model executes the optimization suggestions, the processing module 107 can employ the optimized second deep learning model to process the object data to obtain results of processing the object data.

Figure 3:
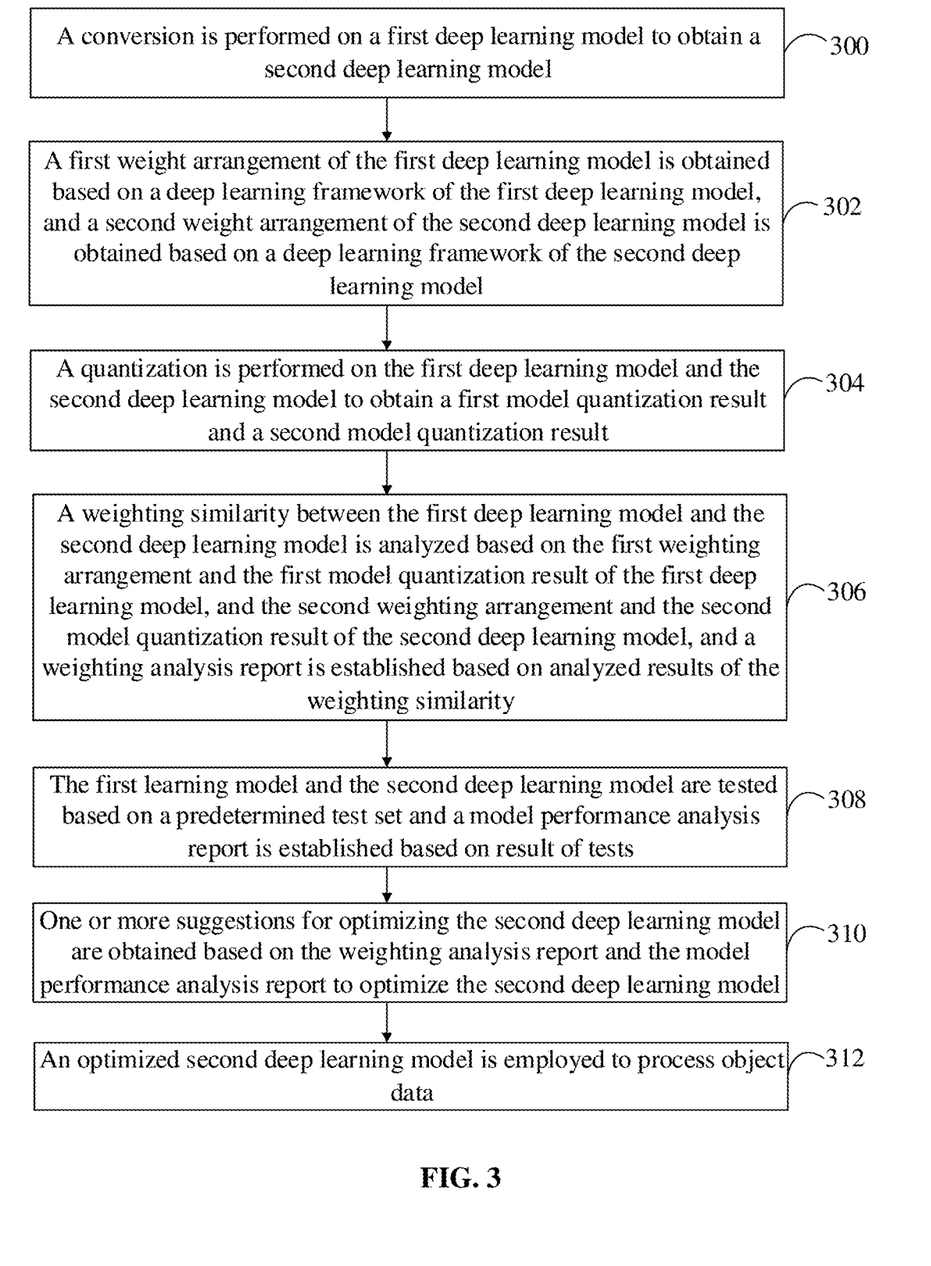
FIG. 3 is a flow diagram of an embodiment of a method for optimizing conversion of models for deep learning, utilized in the device of FIG. 1.

FIG. 3 illustrates one exemplary embodiment of a method for optimizing model conversion of deep learning model. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, a conversion is performed on a first deep learning model to obtain a second deep learning model.

In one embodiment, the first deep learning model and the second deep learning model comprise different deep learning frameworks. For example, in a model development stage, the first deep learning model can be developed, trained and tested based on a Tensorflow framework. When a terminal device needs a model of an NCNN framework to be deployed, the first deep learning model with the Tensorflow framework needs to be converted into a second deep learning model with the NCNN framework, and the second deep learning model is deployed on the terminal device. The terminal device may be an electronic device, such as a mobile phone or a tablet computer. A model conversion can be performed on the first deep learning model based on a predetermined deep learning model conversion tool to obtain the second deep learning model. The predetermine deep learning model conversion tool may be a current model converter, which is not limited here.

In one embodiment, the first deep learning model and the second deep learning model comprise the same model functions, and the model functions of the first deep learning model and the second deep learning model can be set according to an actual requirement. For example, the first deep learning model and the second deep learning model can be configured for image recognition, voice recognition, image processing, data mining, or natural language processing, etc.

In block 302, a first weighting arrangement of the first deep learning model is obtained based on a deep learning framework of the first deep learning model, and a second weighting arrangement of the second deep learning model is obtained based on a deep learning framework of the second deep learning model.

In one embodiment, when the model conversion of the first deep learning model is completed to obtain the second deep learning model, the second weighting arrangement of the second deep learning model is obtained according to the deep learning framework of the second deep learning model. The first weighting arrangement mode of the first deep learning model is obtained according to the deep learning framework of the first deep learning model. The first weighting arrangement of the first deep learning model can represent an arrangement of weighting parameters of the first deep learning model, and the second weighting arrangement of the second deep learning model can represent an arrangement of weighting parameters of the second deep learning model.

In block 304, a quantization is performed on the first deep learning model and the second deep learning model to obtain a first model quantization result and a second model quantization result.

In one embodiment, a specified quantization operation is performed on the first deep learning model to obtain the first model quantization result, and the specified quantization operation is performed on the second deep learning model to obtain the second model quantization result. For example, the specified quantization operation may be performing quantization on weightings of models, or performing quantization on weightings of models and outputting results of activation layers of model.

In one embodiment, weighting distribution information of the first deep learning model is obtained based on the first weighting arrangement of the first deep learning model, and the quantization is performed on the first deep learning model according to the weighting distribution information of the first deep learning model. The weighting distribution information of the first deep learning model can represent a distribution of weighting parameters of the first deep learning model. Weighting distribution information of the second deep learning model is obtained based on the second weighting arrangement of the second deep learning model, and the quantization is performed on the second deep learning model according to the weighting distribution information of the second deep learning model. The weighting distribution information of the second deep learning model can represent a distribution of weighting parameters of the second deep learning model.

In one embodiment, the method of performing the quantization on the first deep learning model according to the weighting distribution information of the first deep learning model can comprise: determining a first number of bits and a first quantization accuracy (int or float) of the quantization of the first deep learning model according to the weighting distribution information of the first deep learning model, and performing the quantization on the first deep learning model based on the first number of bits and the first quantization accuracy. The method of performing quantization on the second deep learning model according to the weighting distribution information of the second deep learning model can comprise: determining a second number of bits and a second quantization accuracy (int or float) of the quantization of the second deep learning model according to the weighting distribution information of the second deep learning model, and performing the quantization on the second deep learning model based on the second number of bits and the second quantization accuracy.

In block 306, a weighting similarity between the first deep learning model and the second deep learning model is analyzed based on the first weighting arrangement and the first model quantization result of the first deep learning model, and the second weighting arrangement and the second model quantization result of the second deep learning model, and a weighting analysis report is established based on analyzed results of the weighting similarity.

In one embodiment, when the first deep learning model and the second deep learning model are quantized, the weighting similarity between the first deep learning model and the second deep learning model is analyzed based on the first weighting arrangement, the first model quantization result, the second weighting arrangement, and the second model quantization result. Then the weighting analysis report can be established based on the analyzed results of the weighting similarity.

In one embodiment, the weighting analysis report can comprises the weighting distribution information of the first deep learning model and the weighting distribution information of the second deep learning model.

In block 308, the first learning model and the second deep learning model are tested based on a predetermined test set and a model performance analysis report is established based on result of tests.

In one embodiment, the model performance analysis report can comprise test results of predicted performance of the first deep learning model and test results of predicted performance of the second deep learning model. Data of the predetermined test set can comprise the samples of the training sample library that are configured to train the first deep learning model and the second deep learning model, and the samples of the training sample library are divided into the training set and the verifying set.

For example, the model functions of the first deep learning model and the second deep learning model are the function of image recognition. The training sample library can comprise one thousand sample images, the training set comprises eight hundred sample images, and the verifying set comprises two hundred sample images. In a training process of the first deep learning model, the first deep learning model is trained based on sample images of the training set, and trained first deep learning model is tested based on sample images of the verifying set to obtain a prediction of the trained first deep learning model. In a training process of the second deep learning model, the second deep learning model is trained based on the sample images of the training set, and trained second deep learning model is tested based on the sample images of the verifying set to obtain a prediction of the trained second deep learning model. The predetermined test set comprises all sample images of the training sample library, the one thousand sample images are employed to test the first deep learning model, and the one thousand sample images are also employed to test the second deep learning model. The model performance analysis report is established based on test results of the one thousand sample images.

In one embodiment, the data of the predetermined test set can further comprise an on-site sample set that is not comprised in the training sample library. For example, sample data of the on-site sample set is data that the model does not touch during the training process. When the second deep learning model is deployed on the terminal device, the on-site sample set may comprise sample data that is obtained by the terminal device in an actual scenario. For example, the second deep learning model is a face recognition model, and the on-site sample set may comprise face images that are captured in an actual face recognition scene.

In one embodiment, the data of the predetermined test set can further comprise an amplified sample set generated by amplifying the verifying set. For example, the samples of the verifying set can be flipped, mirrored, etc., to obtain the amplified sample set.

For example, the verifying set comprises two hundred sample images, multiple sample images of the verifying set can be performed one or more processes, such as translation, flipping, rotation, adjusting contrast, adding Gaussian noise, and color transformation, to obtain two thousands sample images, and the two thousands sample images can be defined as the amplified sample set.

In one embodiment, the method of testing the first learning model and the second deep learning model based on the predetermined test set to establish the model performance analysis report can comprises: respectively testing the first learning model and the second deep learning model based on the training sample library, the on-site sample set, and the amplified sample set, and establishing the model performance analysis report based on a first test result of the training sample library, a second test result of the on-site sample set, and a third test result of the amplified sample set.

In block 310, one or more suggestions for optimizing the second deep learning model are obtained based on the weighting analysis report and the model performance analysis report to optimize the second deep learning model.

In one embodiment, when the weighting analysis report and the model performance analysis report are obtained, the one or more optimization suggestions of the second deep learning model can be analyzed and obtained based on the weighting analysis report and the model performance analysis report, to optimize the second deep learning model. Then, the prediction accuracy of the second deep learning model deployed on the terminal device can be improved, and computing resources (of the terminal device) occupied by the second deep learning model can be saved.

In one embodiment, when the one or more optimization suggestions of the second deep learning model are obtained based on the weighting analysis report and the model performance analysis report, a model developer or a user can control the second deep learning model to execute the one or more optimization suggestions.

In block 312, an optimized second deep learning model is employed to process object data.

In one embodiment, the object data may refer to data that need to be processed by the second deep learning model deployed on the terminal device. For example, the second deep learning model is the face recognition model, the object data is the face images captured on-site by the terminal device. When the second deep learning model executes the optimization suggestions, the optimized second deep learning model can be employed to process the object data to obtain results of processing the object data.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method of optimizing deep learning model for image detection, the method comprising:
    performing a conversion on a first deep learning model to obtain a second deep learning model, wherein the first deep learning model and the second deep learning model comprise different deep learning frameworks, and the first deep learning model is trained based on first sample images;
    obtaining a first weighting arrangement of the first deep learning model based on a deep learning framework of the first deep learning model, and obtaining a second weighting arrangement of the second deep learning model based on a deep learning framework of the second deep learning model;
    performing a quantization on the first deep learning model and the second deep learning model to obtain a first model quantization result and a second model quantization result;
    analyzing a weighting similarity between the first deep learning model and the second deep learning model based on the first weighting arrangement, the first model quantization result, the second weighting arrangement, and the second model quantization result, and establishing a weighting analysis report based on analyzed results of the weighting similarity;
    testing the first learning model and the second deep learning model based on second sample images of a predetermined test set to establish a model performance analysis report;
    obtaining one or more suggestions for optimizing the second deep learning model based on the weighting analysis report and the model performance analysis report to optimize the second deep learning model; and
    employing an optimized second deep learning model to process an object image to obtain a detection result of the object image.

2. The method of claim 1, wherein performing the quantization on the first deep learning model and the second deep learning model comprises:
    obtaining weighting distribution information of the first deep learning model based on the first weighting arrangement of the first deep learning model, and performing the quantization on the first deep learning model according to the weighting distribution information of the first deep learning model; and
    obtaining weighting distribution information of the second deep learning model based on the second weighting arrangement of the first deep learning model, and performing the quantization on the second deep learning model according to the weighting distribution information of the second deep learning model.

3. The method of claim 2, wherein the weighting analysis report comprises the weighting distribution information of the first deep learning model and the weighting distribution information of the second deep learning model.

4. The method of claim 2, wherein performing the quantization on the first deep learning model according to the weighting distribution information of the first deep learning model comprises:
    determining a first number of bits and a first quantization accuracy of the quantization of the first deep learning model according to the weighting distribution information of the first deep learning model; and
    performing the quantization on the first deep learning model based on the first number of bits and the first quantization accuracy.

5. The method of claim 2, wherein performing the quantization on the second deep learning model according to the weighting distribution information of the second deep learning model comprises:
    determining a second number of bits and a second quantization accuracy of the quantization of the second deep learning model according to the weighting distribution information of the second deep learning model; and
    performing the quantization on the second deep learning model based on the second number of bits and the second quantization accuracy.

6. The method of claim 1, wherein the second sample images of the predetermined test set comprise the first sample images for training the first deep learning model and the second deep learning model, and the first sample images are divided into a training set and a verifying set.

7. The method of claim 6, wherein the second sample images of the predetermined test set further comprise an on-site sample set that is not comprised in the first sample images and/or an amplified sample set generated by amplifying the verifying set.

8. The method of claim 7, wherein testing the first learning model and the second deep learning model based on the second sample images of the predetermined test set to establish the model performance analysis report comprises:
    testing the first learning model and the second deep learning model based on the first sample images, the on-site sample set, and the amplified sample set; and
    establishing the model performance analysis report based on a first test result of the first sample images, a second test result of the on-site sample set, and a third test result of the amplified sample set.

9. A device of optimizing deep learning model for image detection, the device comprising:
    at least one processor; and
    a storage device storing one or more programs which when executed by the at least one processor, cause the at least one processor to:
    perform a conversion on a first deep learning model to obtain a second deep learning model, wherein the first deep learning model and the second deep learning model comprise different deep learning frameworks, and the first deep learning model is trained based on first sample images;
    obtain a first weighting arrangement of the first deep learning model based on a deep learning framework of the first deep learning model, and obtain a second weighting arrangement of the second deep learning model based on a deep learning framework of the second deep learning model;
    perform a quantization on the first deep learning model and the second deep learning model to obtain a first model quantization result and a second model quantization result;
    analyze a weighting similarity between the first deep learning model and the second deep learning model based on the first weighting arrangement, the first model quantization result, the second weighting arrangement, and the second model quantization result, and establish a weighting analysis report based on analyzed results of the weighting similarity;
    test the first learning model and the second deep learning model based on second sample images of a predetermined test set to establish a model performance analysis report;
    obtain one or more suggestions for optimizing the second deep learning model based on the weighting analysis report and the model performance analysis report to optimize the second deep learning model; and
    employ an optimized second deep learning model to process an object image to obtain a detection result of the object image.

10. The device of claim 9, wherein the at least one processor performing the quantization on the first deep learning model and the second deep learning model comprises:
    obtaining weighting distribution information of the first deep learning model based on the first weighting arrangement of the first deep learning model, and performing the quantization on the first deep learning model according to the weighting distribution information of the first deep learning model; and
    obtaining weighting distribution information of the second deep learning model based on the second weighting arrangement of the first deep learning model, and performing the quantization on the second deep learning model according to the weighting distribution information of the second deep learning model.

11. The device of claim 10, wherein the weighting analysis report comprises the weighting distribution information of the first deep learning model and the weighting distribution information of the second deep learning model.

12. The device of claim 10, wherein the at least one processor performing the quantization on the first deep learning model according to the weighting distribution information of the first deep learning model comprises:
    determining a first number of bits and a first quantization accuracy of the quantization of the first deep learning model according to the weighting distribution information of the first deep learning model; and
    performing the quantization on the first deep learning model based on the first number of bits and the first quantization accuracy.

13. The device of claim 10, wherein the at least one processor performing the quantization on the second deep learning model according to the weighting distribution information of the second deep learning model comprises:
    determining a second number of bits and a second quantization accuracy of the quantization of the second deep learning model according to the weighting distribution information of the second deep learning model; and
    performing the quantization on the second deep learning model based on the second number of bits and the second quantization accuracy.

14. The device of claim 9, wherein the second sample images of the predetermined test set comprise the first sample images for training the first deep learning model and the second deep learning model, and the first sample images are divided into a training set and a verifying set.

15. The device of claim 14, wherein the second sample images of the predetermined test set further comprise an on-site sample set that is not comprised in the first sample images and/or an amplified sample set generated by amplifying the verifying set.

16. The device of claim 15, wherein the at least one processor testing the first learning model and the second deep learning model based on the second sample images of the predetermined test set to establish the model performance analysis report comprises:
    testing the first learning model and the second deep learning model based on the first sample images, the on-site sample set, and the amplified sample set; and
    establishing the model performance analysis report based on a first test result of the first sample images, a second test result of the on-site sample set, and a third test result of the amplified sample set.

17. A non-transitory storage medium having stored thereon instructions that, when executed by a processor of an electronic device, cause the electronic device to perform a method of optimizing deep learning model for image detection, the method comprising:
    performing a conversion on a first deep learning model to obtain a second deep learning model, wherein the first deep learning model and the second deep learning model comprise different deep learning frameworks, and the first deep learning model is trained based on first sample images;

obtaining a first weighting arrangement of the first deep learning model based on a deep learning framework of the first deep learning model, and obtaining a second weighting arrangement of the second deep learning model based on a deep learning framework of the second deep learning model;

performing a quantization on the first deep learning model and the second deep learning model to obtain a first model quantization result and a second model quantization result;

analyzing a weighting similarity between the first deep learning model and the second deep learning model based on the first weighting arrangement, the first model quantization result, the second weighting arrangement, and the second model quantization result, and establishing a weighting analysis report based on analyzed results of the weighting similarity;

testing the first learning model and the second deep learning model based on second sample images of a predetermined test set to establish a model performance analysis report;

obtaining one or more suggestions for optimizing the second deep learning model based on the weighting analysis report and the model performance analysis report to optimize the second deep learning model; and employing an optimized second deep learning model to process an object image to obtain a detection result of the object image.

* * * * *